United States Patent
Zou et al.

(10) Patent No.: US 7,756,402 B2
(45) Date of Patent: Jul. 13, 2010

(54) METHOD AND CIRCUIT FOR CONTROLLING ROTATION SPEED OF COMPUTER FAN

(75) Inventors: Hua Zou, Shenzhen (CN); Feng-Long He, Shenzhen (CN); Wei Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 114 days.

(21) Appl. No.: 11/953,866

(22) Filed: Dec. 11, 2007

(65) Prior Publication Data

US 2009/0003806 A1    Jan. 1, 2009

(30) Foreign Application Priority Data

Jun. 29, 2007    (CN) .................... 2007 1 0200961

(51) Int. Cl.
    *H02P 7/29*    (2006.01)
(52) U.S. Cl. .................. 388/811; 318/599; 318/811
(58) Field of Classification Search ................ 388/811; 318/599, 811
    See application file for complete search history.

(56) References Cited

U.S. PATENT DOCUMENTS

| | | | | |
|---|---|---|---|---|
| 5,568,350 A * | 10/1996 | Brown | .................. | 361/104 |
| 5,831,847 A * | 11/1998 | Love | .................. | 363/141 |
| 5,947,691 A * | 9/1999 | Brown et al. | .................. | 417/44.1 |
| 6,218,787 B1 * | 4/2001 | Murcko et al. | .................. | 315/194 |
| 6,674,257 B2 * | 1/2004 | Xi | .................. | 318/400.22 |
| 7,138,781 B2 * | 11/2006 | Murray et al. | .................. | 318/400.04 |
| 7,313,466 B2 * | 12/2007 | Chang | .................. | 700/300 |
| 7,355,359 B2 * | 4/2008 | Kuo | .................. | 318/268 |
| 7,425,812 B2 * | 9/2008 | Goldberg | .................. | 318/610 |
| 7,501,717 B2 * | 3/2009 | Chen | .................. | 307/38 |
| 2007/0019383 A1 * | 1/2007 | Chang | .................. | 361/695 |
| 2007/0108923 A1 * | 5/2007 | Chen | .................. | 318/66 |

FOREIGN PATENT DOCUMENTS

| | | |
|---|---|---|
| CN | 1661516 A | 8/2005 |
| CN | 1892609 A | 1/2007 |

* cited by examiner

*Primary Examiner*—Walter Benson
*Assistant Examiner*—Renata McCloud
(74) *Attorney, Agent, or Firm*—Frank R. Niranjan

(57) ABSTRACT

An exemplary method for controlling rotation speed of a computer fan includes: judging the type of a fan by comparing two rotation speeds detected before and after changing a duty cycle of a PWM signal respectively; controlling the computer fan as a 4-pin fan the PWM signals if the rotation speeds are different; and controlling the computer fan as a 3-pin fan via voltage signals converted from the PWM signals if the rotation speeds are equal. And an exemplary circuit for controlling rotation speed of a computer fan is capable of controlling rotation speed of the 4-pin fan via PWM signals, and controlling rotation peed of the 3-pin fan via voltage signals converted from PWM signals.

4 Claims, 2 Drawing Sheets

METHOD AND CIRCUIT FOR CONTROLLING ROTATION SPEED OF COMPUTER FAN

BACKGROUND

1. Field of the Invention

The present invention relates to a method and a circuit for controlling rotation speed of a computer fan.

2. Description of Related Art

Generally, a computer system includes a motherboard with various chips such as a central processing unit (CPU) mounted thereon, a storage device such as a hard disc, and input/output devices, each of which is known to generate heat when operated in a computer system, especially the CPU. If the heat generated from the CPU is not dissipated in a timely fashion, it may damage the CPU or even the computer system.

Typically, a sensor is programmed to be used as a temperature detector for detecting temperature of the CPU. A computer fan is used to facilitate removal of heat to keep the temperature of the CPU within a safe temperature range. A fan controller is provided to adjust fan speed to be more energy efficient while still providing enough heat dissipation. The computer fan includes 3-pin fans, which can be adjusted by a voltage signal and 4-pin fans, which can be adjusted by a pulse-width modulation (PWM) signal controlled by a basic input/output system (BIOS) of the motherboard.

In a 3-pin fan motherboard, a 3-pin fan is connected to the motherboard by a 3-pin header mounted on the motherboard, and a 3-pin fan controller is provided to supply the voltage signal to the 3-pin fan for adjusting the rotation speed of the 3-pin fan. In a 4-pin fan motherboard, a 4-pin fan is connected to the motherboard by a 4-pin fan header mounted on the motherboard in which the fourth pin is used to transmit the PWM signal, and a 4-pin fan controller is provided to supply the PWM signal to the 4-pin fan for adjusting the rotation speed of the 4-pin fan. However, though the 3-pin fan can be connected to the 4-pin fan motherboard by the 4-pin header, it cannot be controlled by the 4-pin fan controller because the 3-pin fan does not have the fourth pin and cannot receive the PWM signal. Therefore, the CPU may be damaged because the heat may not be dissipated properly.

What is needed, therefore, is to provide a method and a circuit which can adjust the rotation speed of a computer fan whether the computer fan is a 3-pin fan or a 4-pin fan.

SUMMARY

An exemplary method for controlling rotation speed of a computer fan, comprising: detecting a rotation speed of the fan; changing duty cycle of a PWM signal; detecting a rotation speed of the fan after the duty cycle of the PWM signal is changed; comparing the two rotation speeds, if the rotation speeds are different, the fan is a first type computer fan whose rotation speed is controlled by the PWM signal; if the rotation speeds are equal, the fan is a second type computer fan whose rotation speed is controlled by a voltage signal; transmitting PWM signals to the fan if the fan is the first type computer fan, and converting the PWM signals to voltage signals and transmitting the voltage signals to the fan if the fan is the second type computer fan.

Other advantages and novel features of the present invention will become more apparent from the following detailed description of preferred embodiment when taken in conjunction with the accompanying drawings, in which:

DETAILED DESCRIPTION

Figure 1:
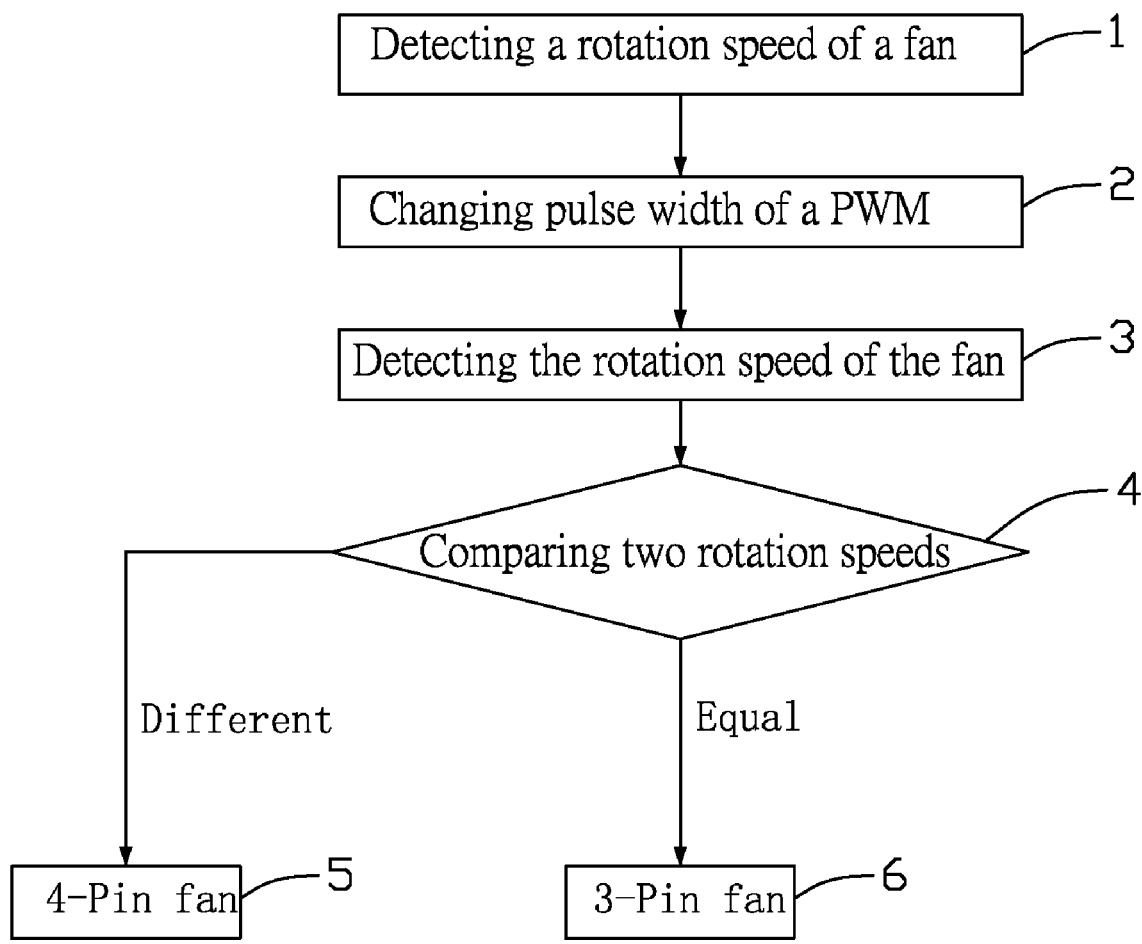
FIG. 1 is an flow diagram of a method for controlling rotation speed of a computer fan in accordance with an embodiment of the present invention.

Referring to FIG. 1, a method for controlling rotation speed of a computer fan in accordance with an embodiment of the present invention includes the following steps.

Step 1: detecting a rotation speed of a fan connected to a motherboard by a sensor.

Step 2: changing a duty cycle of a PWM signal; in this embodiment the duty cycle of the PWM signal is cut in half.

Step 3: detecting the rotation speed of the fan after changing the duty cycle of the PWM signal.

Step 4: comparing the rotation speed detected after changing the duty cycle of the PWM signal with the rotation speed detected before.

Step 5: controlling the fan as a 4-pin fan by using PWM signals when the rotation speed detected after changing the duty cycle of the PWM signal is half of the rotation speed detected before.

Step 6: controlling the fan as a 3-pin fan by using voltage signals when the rotation speeds are equal.

Figure 2:
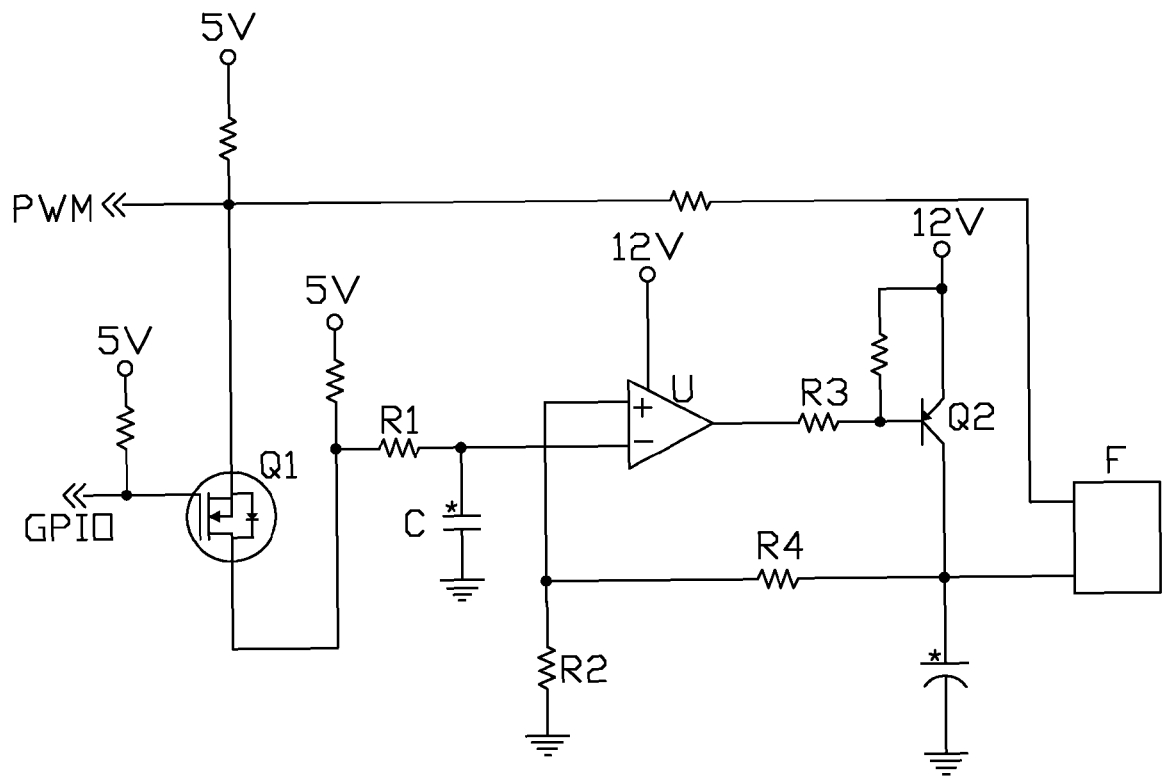
FIG. 2 is a circuit diagram of a circuit for controlling rotation speed of a computer fan in accordance with an embodiment of the present invention.

Referring to FIG. 2, a circuit for controlling rotation speed of a computer fan in accordance with an embodiment of the present invention includes an NMOS transistor functioning as an electric switch Q1, an amplifier U, a PNP transistor Q2, and an output port F such as a 4-pin fan header.

The gate of the NMOS transistor Q1 is provided to receive a control signal GPIO from a BIOS of the motherboard, the drain of the NMOS transistor Q1 is provided to receive a PWM signal, and the source of the NMOS transistor Q1 is grounded via a first resistor R1 and a capacitor C in turn. The amplifier H includes a positive input terminal which is grounded via a second resistor R2, a negative input terminal which is connected to a node between the first resistor R1 and the capacitor C and also connected to a 5V power source via the first resistor R1, a power terminal connected to a 12V power source, and an output terminal. The base of the transistor Q2 is connected to the output terminal of the amplifier H via a third resistor R3, the emitter is connected to the 12V power source, and the collector is connected to the positive input terminal of the amplifier H via a fourth resistor R4. The transistor Q2 outputs a fan control signal via the collector thereof when it receives an amplified voltage signal from the amplifier H via the third resistor R3. The output port F is provided to receive the PWM signal by a fourth pin thereof and the fan control signal by a second pin thereof.

When the motherboard is turned on, the control signal GPIO from the BIOS is at a low level to turn off the NMOS transistor Q1. The BIOS records a rotation speed of a computer fan connected to the output port F and then adjusts the duty cycle of the PWM signal. The BIOS records the rotation speed of the computer fan again and compares it with the rotation speed recorded before. If the rotation speeds are different, the computer fan is a 4-pin fan. The control signal GPIO generated by the BIOS is still at a low level. Therefore, the 4-pin fan connected to the output port F is adjusted by using PWM signals.

If the rotation speeds are equal, the computer fan is a 3-pin fan. The control signal GPIO generated by the BIOS is changed to a high level. Therefore, the NMOS transistor Q1 is turned on. The PWM signal is transmitted to the negative input terminal of the amplifier U via the first resistor R1 and the capacitor C, wherein the first resistor R1 and the capacitor C rectify the PWM signal (digital voltage signal) as an analog voltage signal. The amplifier U receives the analog voltage signal and outputs the amplified voltage signal. The amplified voltage signal controls a quiescent operating point of the transistor Q2 via the third resistor R3, and the transistor Q2 outputs the fan control signal based on the voltage signal. Therefore, the 3-pin fan connected to the output port F is adjusted by using voltage control signals.

The method and the circuit can judge which type of computer fan is connected thereto, and adjust the rotation speed of the computer fan whether the computer fan is a 3-pin fan or a 4-pin fan.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for controlling rotation speed of a computer fan, comprising:
   providing a circuit comprising:
      an NMOS transistor having a gate to receive a first control signal generated by a BIOS, a source to receive a PWM signal, and a drain grounded via a first resistor and a capacitor in turn;
      an amplifier comprising a positive input terminal grounded via a second resistor, a negative input terminal connected to a node between the first resistor and the capacitor and connected to a first power source via the first resistor, and an output terminal;
      a PNP transistor, the base of the PNP transistor connected to the output terminal of the amplifier via a third resistor, the emitter of the PNP transistor connected to a second power source, and the collector of the PNP transistor connected to the positive input terminal of the amplifier via a fourth resistor, the PNP transistor outputting a fan control signal via the collector thereof; and
      an output port configured for the computer fan connecting thereto, the output port comprising two pins respectively receiving the PWM signal and the fan control signal;
   detecting a rotation speed of the fan;
   changing duty cycle of the PWM signal;
   detecting a rotation speed of the fan after the duty cycle of the PWM signal is changed;
   comparing the two rotation speeds, if the rotation speeds are different, the fan is a first type computer fan whose rotation speed is controlled by PWM signals; if the rotation speeds are equal, the fan is a second type fan whose rotation speed is controlled by voltage signals;
   transmitting PWM signals to the fan if the fan is the first type computer fan via the BIOS controlling the control signal GPIO at a low level to turn off the NMOS transistor, and converting the PWM signals to voltage signals and transmitting the voltage signals to the fan if the fan is the second type fan via the BIOS controlling the control signal GPIO at a high level to turn on the NMOS transistor.

2. The method as claimed in claim 1, wherein the duty cycle of the PWM signal is cut in half in the step of changing duty cycle of the PWM signal.

3. The method as claimed in claim 2, wherein the rotation speed of the fan detected after changing the duty cycle of the PWM signal is half of the rotation speed of the fan detected before.

4. The method as claimed in claim 1, wherein the first type computer fan is a 4-pin fan, the second type computer fan is a 3-pin fan.

* * * * *